United States Patent [19]
Tanigaki et al.

[11] Patent Number: 5,172,104
[45] Date of Patent: Dec. 15, 1992

[54] DISPLAY DEVICE

[75] Inventors: Yasushi Tanigaki; Yoshikazu Sato, both of Tokyo, Japan

[73] Assignee: U.S. Philips Corporation, New York, N.Y.

[21] Appl. No.: 478,125

[22] Filed: Feb. 7, 1990

[30] Foreign Application Priority Data

Feb. 13, 1989 [JP] Japan .................................... 1-33195

[51] Int. Cl.$^5$ .............................................. G09G 3/36
[52] U.S. Cl. .................................... 340/783; 340/784; 340/707; 358/241
[58] Field of Search ............... 340/783, 784, 785, 707, 340/719; 358/241; 350/332, 333, 334, 342, 345

[56] References Cited

U.S. PATENT DOCUMENTS

| 4,345,248 | 8/1982 | Togashi et al. | 340/784 |
| 4,449,125 | 5/1984 | Clerc et al. | 340/784 |
| 4,655,552 | 4/1987 | Togashi et al. | 350/334 |
| 4,679,909 | 7/1987 | Hamada et al. | 350/332 |
| 4,818,991 | 4/1989 | Gay | 340/719 |

Primary Examiner—Ulysses Weldon
Assistant Examiner—M. Fatahiyar
Attorney, Agent, or Firm—Norman N. Spain

[57] ABSTRACT

An active display device with picture elements (9) arranged in a matrix is driven via active switches (1). Part of the picture electrodes (9) are driven via light per actuated switches (9) between the picture electrodes and a read-out electrode (5).

6 Claims, 5 Drawing Sheets

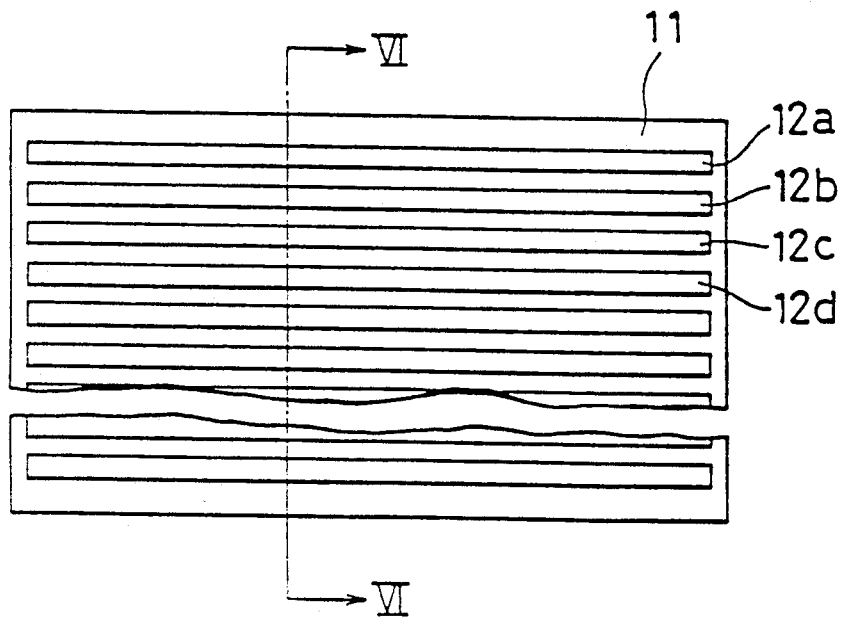
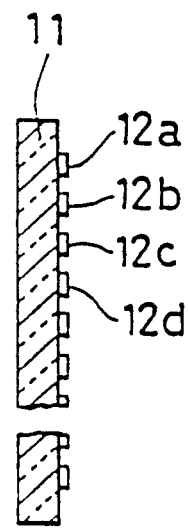
FIG. 5  FIG. 6
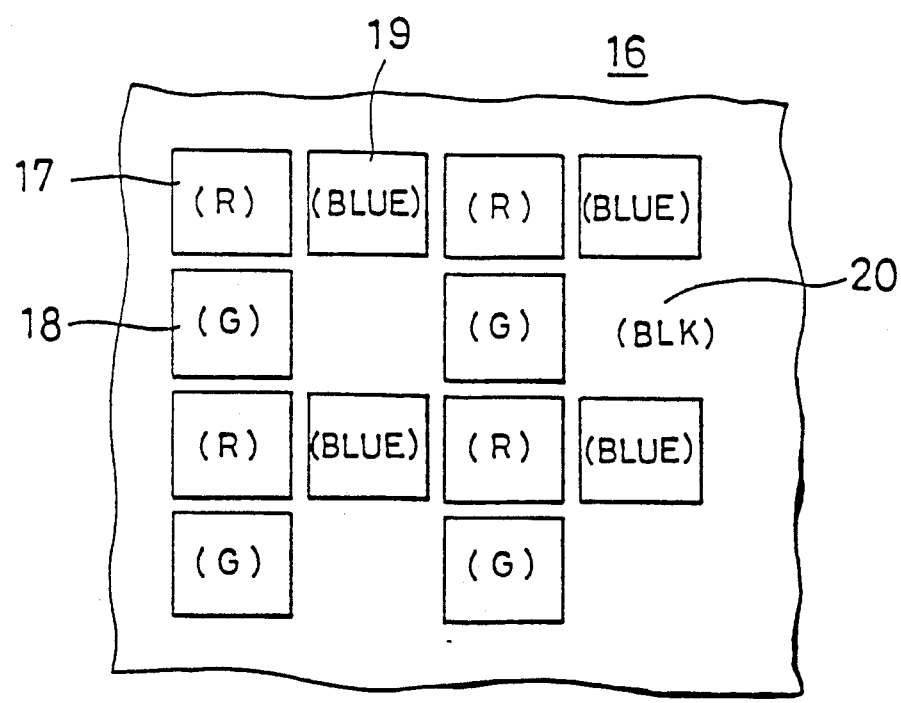
FIG. 7

1

DISPLAY DEVICE

BACKGROUND OF THE INVENTION

The invention relates to a display device having a first substrate, on which pixel electrodes and correspondingly therewith active elements are provided, a display material and a second substrate, the first and second substrata being disposed on opposite sides to each other with respect to the display material sandwiched therebetween.

The invention is used in a display device in which an input function is incorporated.

More specifically, the present invention is used in a flat-type display device with an input function in which a liquid crystal material, an EC material or the like is used. Such a display device with an input function is suitable for use as a device for the purpose of education or office automation, such as a combination of a CRT display device with a light pen, wherein information displayed on the screen can be selected at its displayed position and sent to another device, or wherein information of a display position on the screen can directly be input.

A liquid-crystal type display device in which an input function with the aid of light is incorporated is known, for example, from Japanese Patent Applications Laid-Open Nos. 60-195519 and 61-6729.

In the conventional crystal display device shown, for example, in FIG. 11, scan electrodes $6a$, $6b$, ... are provided on a substrate which is disposed on one side of a liquid crystal material 2. Another substrate disposed on the other side of the liquid crystal material is provided thereon with active elements $1a$, $1b$, ..., signal electrodes $3a$, $3b$, ..., photo-sensitive elements $7a$, $7b$, ..., scan electrodes $4a$, $4b$, ... for the photosensitive electrodes, and read-out electrodes $5a$, $5b$, .... In this case, a display operation is performed by driving the active elements $1a$, $1b$, ... and an input function is established by the use of the photo-sensitive elements $7a$, $7b$, ....

In another example of the conventional devices shown in FIG. 12, a substrate disposed on one side of a liquid crystal material 2 is provided thereon with an electrode of a transparent conductive material. Another substrate disposed on the other side of the liquid crystal material is provided thereon with active elements $1a$, $1b$, ..., scan electrodes $8a$, $8b$, ... for the active elements, photo-sensitive elements $7a$, $7b$, ..., and read-out electrodes $4a$, $4b$, ... for the photo-sensitive elements.

With the conventional display device of the above-described type, a substantial number of electrodes such as the signal electrodes, the scan electrodes for the photo-sensitive elements and the read-out electrodes must be provided on the same substrate in addition to the active elements and the photo-sensitive elements. The process for the fabrication of the display device is therefore complicated and the product yield rate is therefore low. in the case of the conventional display device shown in FIG. 11, since the electrodes for the display function and those for the input function are separated from each other, this display device has a disadvantage that a circuit for driving the above electrodes is complicated.

Display devices similar to the above-described conventional display devices are also disclosed in Japanese Patent Applications Laid-Open Nos. 56-104387, 56-85792 and 59-94736 and Japanese Patent Application Publication No. 57-49912.

All the conventional display devices disclosed in the above published documents have been designed for monochromatic picture display, and none of the documents mention a technology for color picture display.

OBJECTS AND SUMMARY OF THE INVENTION

It is therefore one of the objects of the present invention to provide a flat display device, for example, of a liquid crystal or an EC type with an input function, in which the structure of a circuit on the substrate is simple so that the process for fabrication can be simplified and that a high product yield rate can be obtained.

It is another object of the invention to provide such a display device which is capable of displaying a color picture.

According to the present invention, the above objects are obtained in the following manner.

The scan electrodes for the active elements and those for the photo-sensitive elements are provided on a substrate other than the substrate on which the above elements are formed and, in addition, the two groups of scan electrodes are combined into one group of common scan electrodes and formed on said the other substrate, whereby the circuits on the respective substrata are simplified.

Thus, according to the present invention, a display device having a first substrate, on which pixel electrodes and correspondingly therewith active elements are provided, a display material and a second substrate disposed on a side opposite to the first substrate with respect to the display material which is sandwiched between the two substrata, is characterized in that the first substrate is provided thereon with photo-sensitive elements each for a predetermined number of ones of the pixel electrodes and comprises at least one of semiconductor materials which are included in the active elements, the first substrate being provided with a group of signal electrodes, which extend in one of a row and a column direction of the pixel electrodes so as to be connected thereto, and with a group of read-out electrodes which extend in the same direction as said signal electrodes so as to be connected to the photo-sensitive elements, the second substrate being provided with a group of scan electrodes which extend in a direction perpendicular to the direction in which said signal electrodes extend.

With the above structure, the wiring structure on the first substrate on which the active elements and the photo-sensitive elements are provided becomes simple, so that the first substrate with the wiring structure can be fabricated at a significantly high yield rate.

Also, by virtue of the combining of the two groups of scan electrodes into one group of common scan electrodes, what are formed on the second substrate are the scan electrodes in the form of simple stripes, so that the second substrate with the circuit can be fabricated at a high yield rate. In addition, the common scan electrodes make it possible to perform processing for both display and input operations by the sequential driving of these scan electrodes. A logic circuit for the scan electrodes can therefore be simplified in structure, which may reduce the possibility of occurrence of errors in the display operation caused by the input operation and may provide a good and stable display.

According to the present invention, the photo-sensitive elements may be arranged so as to be responsive mainly to radiation, other than visible radiation with a filter for blocking visible radiation being provided corresponding to the photo-sensitive elements in the display device on a display screen side of the photo-sensitive elements. With this structure, each photo-sensitive element responds only to radiation out of the range of the visible radiation, so that the input function can work in the normal surroundings and will not be adversely affected even when a display in full color is provided.

BRIEF DESCRIPTION OF THE DRAWING

The invention will now be described with reference to the drawings in which:

FIG. 5 is a plan view of an opposing substrate in the embodiment;

FIG. 6 is an illustration showing a cross section of the substrate of FIG. 5 taken along the line VI—VI;

FIG. 7 is an illustration showing one example of a color filter employed in the embodiment;

DESCRIPTION OF PREFERRED EMBODIMENTS

Figure 1:
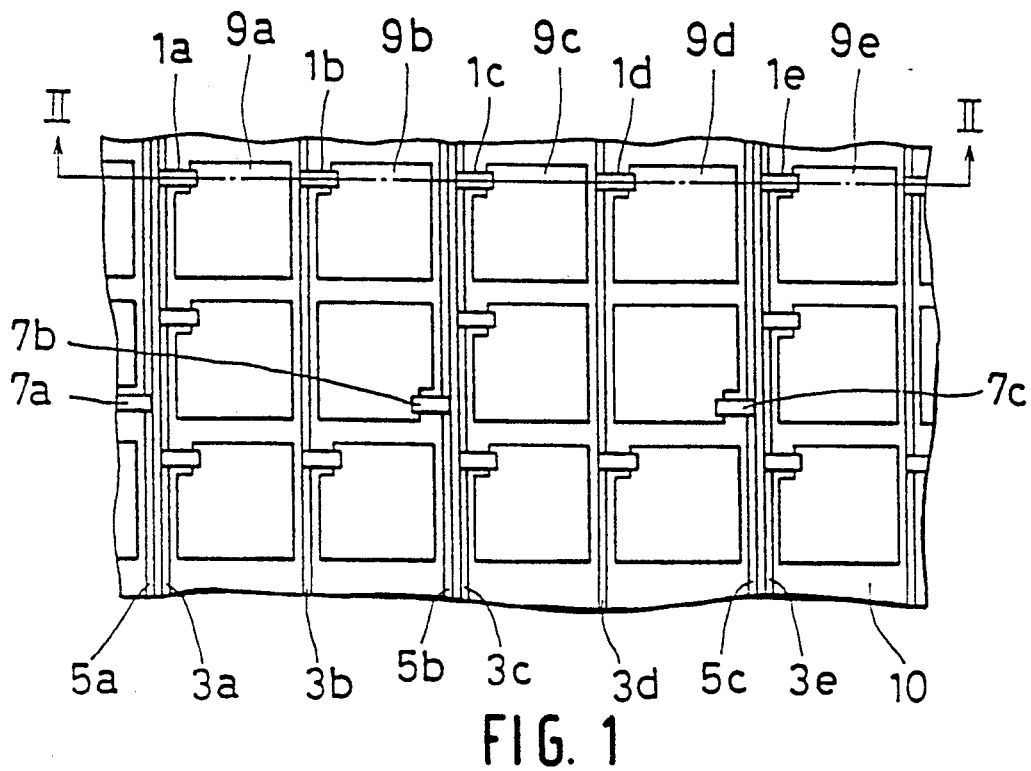
FIG. 1 is a plan view of an enlarged portion of a substrate on the side provided with a signal electrodes in an embodiment of a display device according to the invention.
Figure 2:
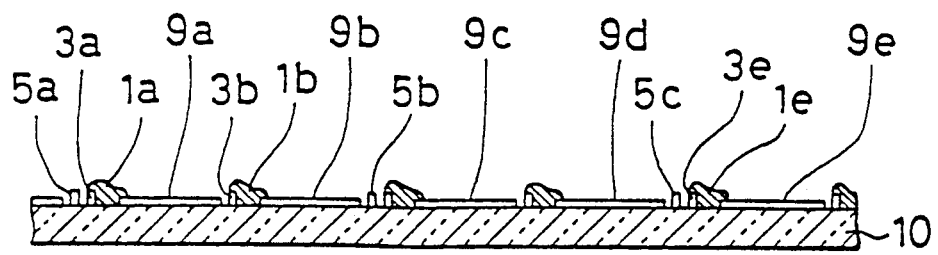
FIG. 2 is an illustration showing a cross section of the view of FIG. 1 taken along the line II—II.

FIGS. 1 and 2 show a substrate 10 which is disposed on one of the sides of a liquid crystal material in a liquid-crystal type color display device according to one embodiment of the invention, wherein FIG. 1 is a plan view of an enlarged part of the substrate 10 and FIG. 2 is a cross-sectional view of the substrate of FIG. 1 along the line II—II. In these figures, the width of each electrode is exaggerated. The substrate 10 is composed of a transparent material, such as a soda glass or a quartz glass, on which a number of pixel electrodes 9a, 9b, . . . each corresponding to a pixel are provided in the form of a matrix, for example, by patterning of an ITO layer.

Figure 3:
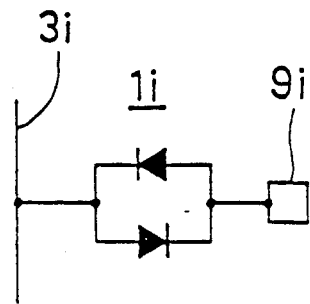
FIG. 3 is a circuit diagram of an equivalent circuit of each active element 1 on the substrate of FIG. 1.

Also provided on the substrate 10 are active elements 1a, 1b, . . . for driving the pixel electrodes, respectively. The active elements comprise semiconductor materials, such as a Si and Se, or are formed each as a ring diode as shown in FIG. 3. Furthermore, the substrate 10 is provided thereon with signal electrodes 3a, 3b, . . . each for supplying a display signal to those active elements which correspond to a column of pixels (in FIG. 1, a column of pixels being those arranged in the vertical direction). These signal electrodes are also formed by subjecting a metal layer composed, for example, of ITO or Cr, to a patterning similarly to the case of the pixel electrodes.

Figure 4:
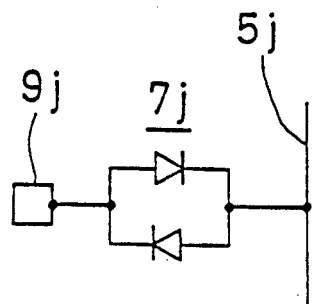
FIG. 4 is a circuit diagram of an equivalent circuit of each photo diode 7 on the substrate of FIG. 1.

The substrate 10 is further provided thereon with photodiodes (photo-sensitive elements) 7a, 7b, . . . for giving this display device an input function, and with read-out electrodes 5a, 5b, . . . connected to these photodiodes 7. In this case, each photodiode 7 takes the form of a ring diode as shown in FIG. 4 and is formed simultaneously with the active elements 1a, 1b, . . . , that is to say, in the same process in which the active elements are formed. Each of the photodiodes 7 is formed of a predetermined number of pixel electrodes 9 (of 4 pixel electrodes, in FIG. 4). The read-out electrodes 5 are also formed simultaneously with the signal electrodes 3a, 3b, . . . .

As is apparent from FIG. 1, the wiring pattern on the substrate 10 comprises only signal electrodes 3a, 3b, . . . and the read-out electrodes 5a, 5b, . . . which are in parallel with the signal electrodes. The wiring pattern has thus no intersections and is very simple in structure. Therefore, the formation of the signal and read-out electrodes on the substrate 10 and that of the elements to be provided between these electrodes and the pixel electrodes are much easier, which will enhance the yield rate. In the process of production of the substrate 10, the band-gap of the a-Si, the condition for the formation of layers or the like is so determined with regard to the active elements that a leak of light to these elements is suppressed.

FIGS. 5 and 6 show another substrate 11 which is disposed on the side opposite to the substrate 10 with the liquid crystal material being sandwiched therebetween. FIG. 5 is a plan view and FIG. 6 is a cross-section along the line VI—VI in FIG. 5. In these figures, the width of each electrode, for example, is exaggerated in. The substrate 11 is provided thereon with scan electrodes 12a, 12b, . . . formed from a transparent conductive layer such as ITO, each scan electrode being correspondent to a row of pixel electrodes 9.

FIG. 7 is a plan view of a part of a color filter 16 which is provided on the opposing substrate 11 for a color display. This color filter 16 includes red (R) areas 17, green (G) areas 18 and blue (BLUE) areas 19. The remaining area 20 of the color filter 16 constitutes a black (BLK) area for absorbing visible rays. The color filter 16 is formed on the opposing substrate 11 in a known method such as by deposition.

Figure 8:
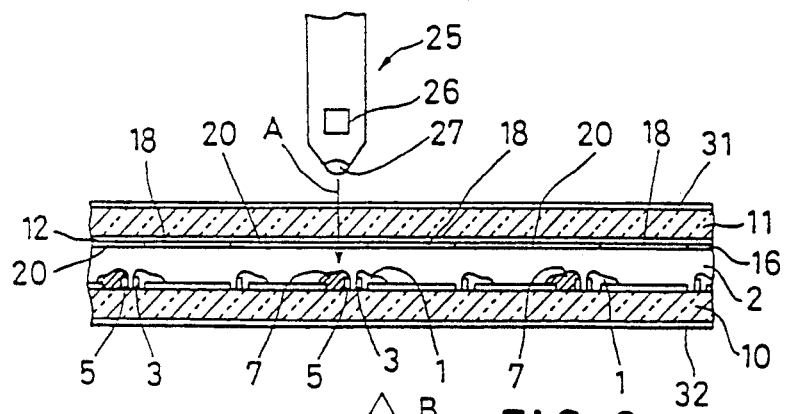
FIG. 8 is an illustration showing a partial cross section of the display device according to the embodiment.

The aforesaid substrate 10, the opposing substrate 11 and the color filter 16 are assembled as shown in FIG. 8 to form the display device according to the present invention. In FIG. 8, denoted by a reference numeral 2 is the liquid crystal material (a display material) provided between the substrata 10 and 11, and, denoted by reference numerals 31 and 32, are polarizing plates provided on the free surfaces of the substrata 11 and 10, respectively. In this case, the surface of this device on the side of the polarizing plate 31 is the front surface or the display surface. The display device is also provided at its rear with a back-light source (not shown) for illuminating the device as indicated by an arrow B. Shown at 25 is a light pen which comprises a LED 26 for emitting a ray other than the visible rays, such as an infra-red ray. This infra-red ray is focused by a lens 27 to irradiate the display surface of the display device (see arrow A). The irradiating ray need not be focused too much. It is rather preferable that the beam diameter be two to three millimeters in order to ease the detection of the ray and to avoid erroneous operations of the active elements.

Figure 9:
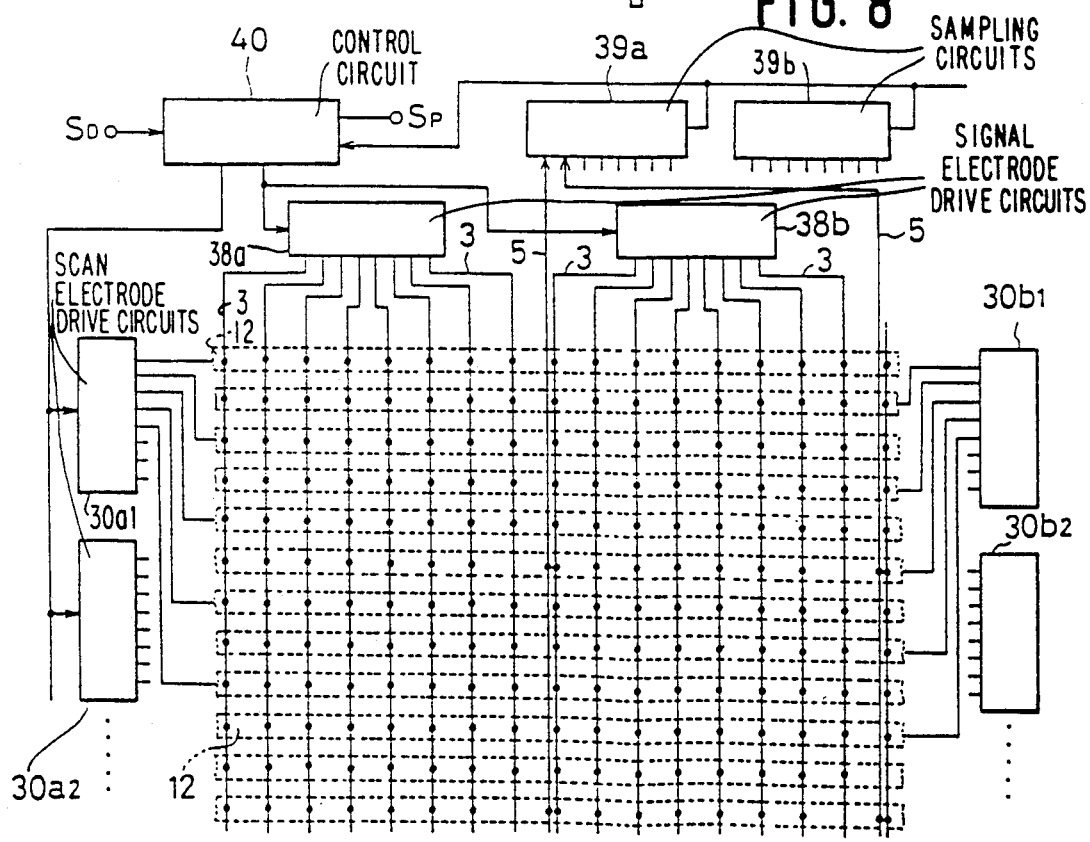
FIG. 9 is a block diagram of a display and input control circuit in the embodiment in which the control circuit is connected to the respective electrodes on the substrata.

FIG. 9 is a block diagram of one example of a display and input control circuit for the above-described display device. The substrate 10 is so constructed that each photodiode 7 is provided per 6×8 pieces of pixel electrodes 9. In FIG. 9, the junction points between the active elements 1 and the signal electrodes 3 are indicated by dots on the electrodes 3, and the junction points between the photodiodes 7 and the read-out electrodes 5 are indicated by dots on the electrodes 5. The reason for the above construction is that any information, whether it is a pattern image or a character image, is actually displayed on a basis of display units each composed of several pieces of pixels (or dots), so that each photodiode 7 may be provided per several pieces of pixels rather than per a respective one of the pixels. In FIG. 9, shown at $30_{a1}$, $30_{a2}$, ... and $30_{b1}$, $30_{b2}$, ... are scan-electrode drive circuits for driving the scan electrodes 12 in accordance with an output from a control circuit 40. The circuits $30_{a1}$, $30_{a2}$, ... drive the odd-numbered scan electrodes 12, and the circuits $30_{b1}$, $30_{b2}$, ... drive the evennumbered scan electrodes 120. Also provided are signal-electrode drive circuits 38a, 38b, ... which drive signal electrodes 3 in accordance with another output from the control circuit 40. The read-out electrodes 5 are connected to sampling circuits 39a, 39b, ... which are provided for detecting an irradiated one of the photodiodes 7. The control circuit 40 receives a picture signal $S_D$ and outputs a position-information signal $S_P$ representative of a detected position.

The display and input operation of the device having the above-described construction will now be described.

The display operation is effected by causing the scan-electrode drive circuit 30 to sequentially drive the scan electrodes 12 and by causing the signal-electrode drive circuit 38 to drive those signal electrodes 3 which correspond to the pixel electrodes 9 in the desired columns. The liquid crystal material is thus changed in state at its portions corresponding to the desired pixel electrodes, and a picture display is made by passing the back-light (indicated by the arrow B in FIG. 8) through the color filter 16 and the polarizing plate 31.

The input operation is achieved by irradiating, through the filter 16, the photodiode 7 at the desired position by the infra-red ray emitted from the light pen 25 shown in FIG. 8 to thereby rapidly decrease the resistance of the irradiated photodiode in accordance with its photo-conductivity. The change in resistance is detected by the sampling circuits 39, whereby the irradiated position or address is determined. The photodiodes at those positions where no irradiation is made by the light pen 25 are not excited, because visible light from the exterior is cut off by the visible-ray blocking area 20. Therefore, the resistance of each of these photodiodes does not change.

Figure 10:
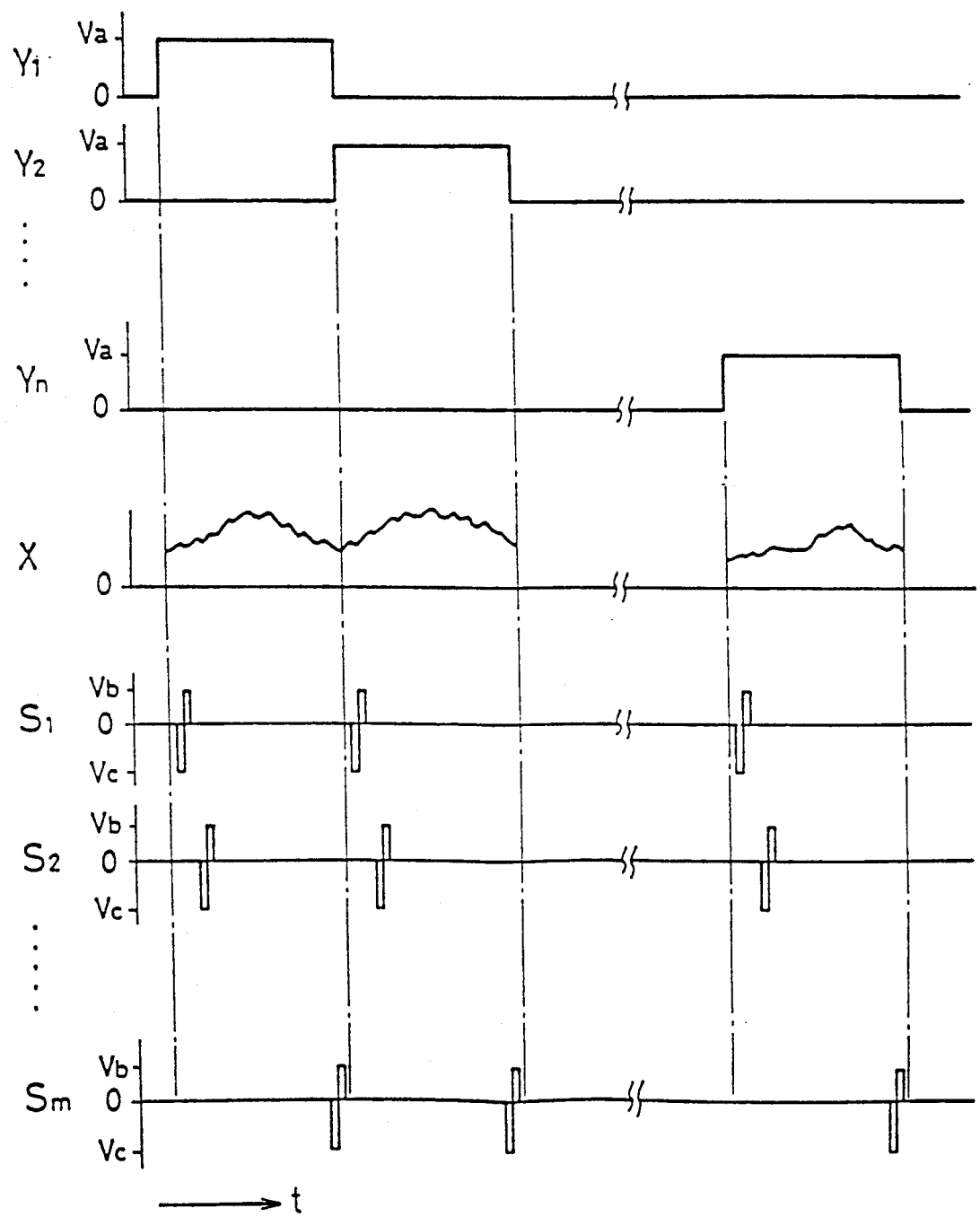
FIG. 10 is a timing chart for explaining the operation of the display and input control circuit.
Figure 11:
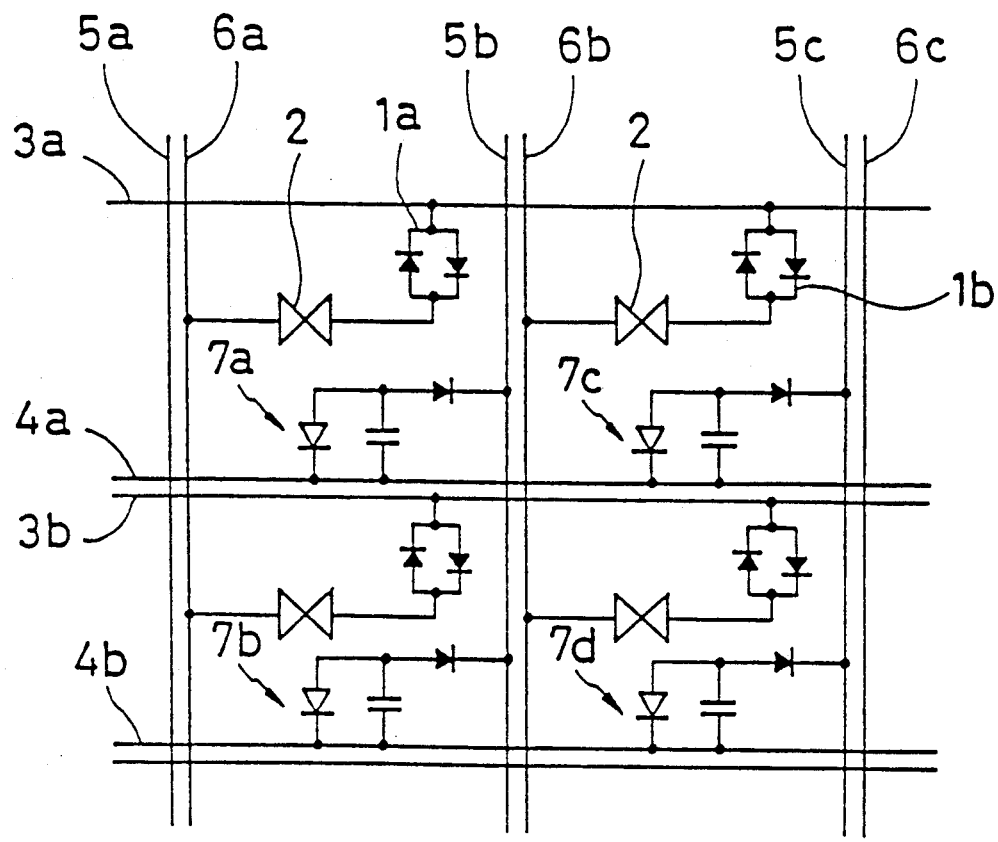
FIGS. 11 and 12 are circuit diagrams of examples of circuits on the substrata in the conventional display devices of the prior art.
Figure 12:
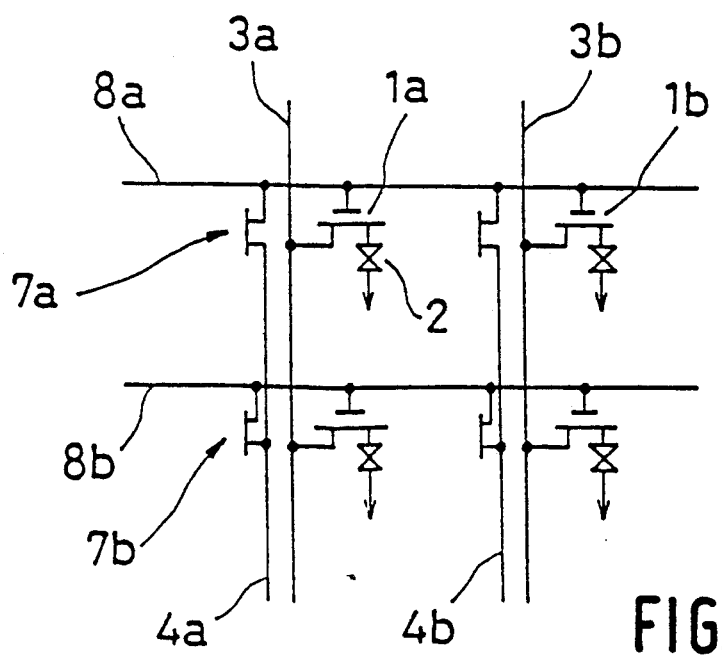

The operation of the above embodiment will now be described in more detail with reference to the timing chart of FIG. 10.

Shown at Y1, Y2, ... are voltage waveforms of the scan signals applied to the scan electrodes 12 which are common to the active elements 1 for display and the photosensitive elements 7. Thus, the scan signals each having a voltage Va and a predetermined time length are sequentially applied to the scan electrodes 12. Shown at X is the display signal which is divided into pieces of an identical time length within each duration time of the scan voltage Va and applied sequentially to the signal electrodes 3.

The sampling of the photodiodes 7a, 7b, ... for detection of their conductive states is performed in the following manner. The read-out electrodes 5a, 5b, ... are supplied, within the duration time of each scan signal Y, sequentially with pulsed S1, S2, ... each having a negative peak voltage Vc and a positive peak voltage Vb. During this time, it is determined whether a flowing-in current caused by each pulse of the voltage Vc is present or not. In this case, the pulses of the voltage Vb serve to perform the discharge operation.

In the above-described embodiments, a ring diode is employed as each active element for driving the pixel electrode. It will, however, be apparent that transistors can be used in the place of the ring diodes although this will result in a more complicated wiring pattern on the substrate 10.

In the case where a color display is not necessary, similar features can be obtained by providing a filter area for blocking light from the exterior only at the position of each photo-sensitive element.

As will be appreciated from the foregoing, with the structure of the display device according to the present invention, the electrodes to be formed on the opposing substrate are common to the display operation and the input operation, and are in the form of simple stripes. In addition, the signal electrodes and the read-out electrodes to be formed on the substrate, on which the active and photo-sensitive elements are formed, have no intersections and are thus simple in structure. It is therefore very easy to form the circuits on the respective substrata, which will make it possible to produce the display device at a high yield rate.

Furthermore, since the scan electrodes are common to the display and input functions, these electrodes can be driven by a simple logic circuit, which will avoid any confused operation in the logic circuits for the display and the sampling. The simple logic circuit can also avoid any possible errors in the display operation which will be caused by the input operation.

We claim:

1. A display device having a first substrate, on which pixel electrodes and correspondingly therewith active elements are provided, a display material and a second substrate, the first and second substrate being disposed on opposite sides to each other with respect to the display material sandwiched therebetween, said display device CHARACTERIZED in that said active elements are two terminal devices, the first substrate is provided thereon with photo-sensitive elements each for a predetermined number of ones of the pixel electrodes and comprises at least one semiconductor materials which are included in the active elements, said first substrate being provided with a group of signal electrodes, which extend in either a row or a column direction and are connected to the pixel electrodes and with a group of read-out electrodes which extend in the same direction as said signal electrodes and are connected to said photo-sensitive electrodes, the second substrate being provided thereon with a group of scan electrodes which extend in a direction perpendicular to the direction in which said signal electrodes extend.

2. A display device according to claim 1 characterized in that each of said photo-sensitive elements is constructed so as to be sensitive mainly to radiation other than visible radiation, and in that a filter for blocking the visible radiation is provided correspondingly to said photo-sensitive elements in said display device on a display screen side of said photo-sensitive elements.

3. A display device according to claim 2, characterized in that said filter comprises colored areas each of which has one of the three primary colors red, blue and green and corresponds to a respective one of said pixel electrodes.

4. A display device according to claim 1, further comprising scanning means for sequentially driving said scan electrodes within each display period; signal-electrode driving means for sequentially driving said signal electrodes within a period of driving of each scan electrode in accordance with information of a picture to be displayed; read-out electrode driving means for sequentially driving in response to a sampling signal within the period of driving of each scan electrode; and detecting means for detecting, in accordance with currents which flow through said photo-sensitive elements in response to said sampling signal, that one of said photo-sensitive elements is receiving radiation.

5. A display device according to claim 2, further comprising scanning means for sequentially driving said scan electrodes within each display period; signal-electrode driving means for sequentially driving said signal electrodes within a period of driving of each scan electrode in accordance with information of a picture to be displayed; read-out electrode driving means for sequentially driving in response to a sampling signal within the period of driving of each scan electrode; and detecting means for detecting, in accordance with currents which flow through said photo-sensitive elements in response to said sampling signal, that one of said photo-sensitive elements is receiving radiation.

6. A display device according to claim 3, further comprising scanning means for sequentially driving said scan electrodes within each display period; signal-electrode driving means for sequentially driving said signal electrodes within a period of driving of each scan electrode in accordance with information of a picture to be displayed; read-out electrode driving means for sequentially driving in response to a sampling signal within the period of driving of each scan electrode; and detecting means for detecting, in accordance with currents which flow through said photo-sensitive elements in response to said sampling signal, that one of said photo-sensitive elements is receiving radiation.

* * * * *

UNITED STATES PATENT AND TRADEMARK OFFICE
CERTIFICATE OF CORRECTION

PATENT NO. : 5,172,104
DATED : December 15, 1992
INVENTOR(S) : Yasushi Tanigaki, et al It is certified that error appears in the above-indentified patent and that said Letters Patent is hereby corrected as shown below:

Col. 6, line 60, "electrodes" should be --elements--.

Signed and Sealed this

Sixteenth Day of August, 1994

*Attest:*

BRUCE LEHMAN

*Attesting Officer*     *Commissioner of Patents and Trademarks*